US012064836B2

(12) United States Patent
Paulus et al.

(10) Patent No.: US 12,064,836 B2
(45) Date of Patent: Aug. 20, 2024

(54) MINI-CORE SURFACE BONDING

(71) Applicant: RTX Corporation, Farmington, CT (US)

(72) Inventors: John R. Paulus, Afton, VA (US); Jimmy Johnson, Charlottesville, VA (US)

(73) Assignee: RTX CORPORATION, Farmington, CT (US)

( * ) Notice: Subject to any disclaimer, the term of this patent is extended or adjusted under 35 U.S.C. 154(b) by 141 days.

(21) Appl. No.: 17/738,531

(22) Filed: May 6, 2022

(65) Prior Publication Data

US 2022/0339746 A1 Oct. 27, 2022

Related U.S. Application Data

(62) Division of application No. 17/237,655, filed on Apr. 22, 2021, now Pat. No. 11,440,146.

(51) Int. Cl.

| | |
|---|---|
| ***B22C 9/10*** | (2006.01) |
| ***B22C 9/00*** | (2006.01) |
| ***B22C 9/22*** | (2006.01) |
| ***B22C 9/24*** | (2006.01) |
| ***B22D 33/04*** | (2006.01) |
| ***B23P 15/04*** | (2006.01) |
| ***F01D 5/14*** | (2006.01) |
| *B22D 19/00* | (2006.01) |

(52) U.S. Cl.

CPC ................ *B23P 15/04* (2013.01); *B22C 9/00* (2013.01); *B22C 9/10* (2013.01); *B22C 9/22* (2013.01); *B22C 9/24* (2013.01); *B22D 33/04* (2013.01); *F01D 5/14* (2013.01); *B22D 19/0072* (2013.01); *F05D 2230/60* (2013.01); *Y10T 29/49339* (2015.01); *Y10T 29/49341* (2015.01)

(58) Field of Classification Search

CPC .............. B22C 9/10; B22C 9/103; B22C 9/24
USPC .......................................................... 164/369
See application file for complete search history.

(56) References Cited

U.S. PATENT DOCUMENTS

| | | | | |
|---|---|---|---|---|
| 6,186,217 | B1 | 2/2001 | Sikkenga et al. | |
| 6,637,500 | B2 | 10/2003 | Shah et al. | |
| 7,144,220 | B2 | 12/2006 | Marcin, Jr. | |
| 8,302,668 | B1 | 11/2012 | Bullied et al. | |
| 9,486,854 | B2 | 11/2016 | Propheter-Hinckley | |
| 10,300,526 | B2 | 5/2019 | Propheter-Hinckley et al. | |
| 10,648,668 | B2 | 5/2020 | Cook, III et al. | |
| 10,801,407 | B2 | 10/2020 | Quach et al. | |
| 10,987,727 | B2 | 4/2021 | Propheter-Hinckley | |
| 11,440,146 | B1 * | 9/2022 | Paulus et al. | B22C 9/00 |

(Continued)

OTHER PUBLICATIONS

Search Report issued for European Patent Application No. 22169410.2; Application Filing Date Apr. 22, 2022; Date of Mailing Sep. 7, 2022 (10 pages).

*Primary Examiner* — Kevin P Kerns
(74) *Attorney, Agent, or Firm* — CANTOR COLBURN LLP

(57) ABSTRACT

A method of bonding a mini-core to a surface of a core is provided. The method includes providing the mini-core with an attachment device that includes a protrusion of a surface of the mini-core, dipping the protrusion into a supply of paste to transfer a fixed quantity of paste to the protrusion and affixing the protrusion to the surface of the core with the fixed amount of paste interposed between the surface and the protrusion.

15 Claims, 4 Drawing Sheets

Providing mini-core with attachment device — 101
Dipping attachment device into supply of paste to transfer fixed quantity of paste to attachment device — 102
Affixing the protrusion to the surface of the core with the fixed amount of paste interposed between the surface and the protrusion — 103
Pressing attachment device onto surface to drive paste toward forming fillet at base of attachment device — 1031

301 302 303 304 305

(56) References Cited

U.S. PATENT DOCUMENTS

| | | | |
|---|---|---|---|
| 2007/0221359 | A1 | 9/2007 | Reilly |
| 2010/0122789 | A1 | 5/2010 | Piggush et al. |
| 2016/0376989 | A1 | 12/2016 | Quach et al. |
| 2020/0180015 | A1 | 6/2020 | Propheter-Hinckley |

* cited by examiner

MINI-CORE SURFACE BONDING

CROSS-REFERENCE TO RELATED APPLICATIONS

This application is a division of U.S. Pat. No. 11,440,146, filed Apr. 22, 2021, the contents of which are hereby incorporated by reference in its entirety.

BACKGROUND

The present disclosure relates to the formation of cores and, more particularly, to cores with mini-cores bonded thereto.

Certain high-performance turbine vane designs require numerous, very small and fragile cores, which are referred to as mini-cores, on the pressure side of the main body of the core. Currently, however, it is not possible to cast these geometries monolithically with the main body core and therefore the mini-cores are cast separately and subsequently bonded to the main body of the core.

Bonding the mini-cores is typically accomplished by forming a post-in-hole joint in which a hole or recess is formed in the surface of the main body of the core where the mini-core is going to be bonded, paste is metered into the hole or recess and a post of the mini-core is inserted therein. This process presents multiple issues, though. Notably, it can be difficult to meter a correct amount of paste into the hole due to the viscous nature of the paste. As a result, there is frequently too much or not enough paste in the joint. This, in turn, leads to a relatively poor joint interface. In addition, manual cleaning of the bond area can be difficult, labor intensive and variable due to the area being small and inaccessible. As an example of the difficulty in creating the bond properly, it can require a skilled technician over an hour to bond only five mini-cores for a given vane. Moreover, even with this time requirement, joint detail at the base can be variable. An additional issue with the process is that the paste often has to be thickened with filler to prevent shrink in the eventual arrangement. The thickened paste is thus hard to work with and does not flow well. Consequently, slight variances in either the post or hole can cause formation of a relatively bad or unreliable joint.

Accordingly, an improved method of bonding mini-cores to cores is needed.

BRIEF DESCRIPTION

According to an aspect of the disclosure, a method of bonding a mini-core to a surface of a core is provided. The method includes providing the mini-core with an attachment device that includes a protrusion of a surface of the mini-core, dipping the protrusion into a supply of paste to transfer a fixed quantity of paste to the protrusion and affixing the protrusion to the surface of the core with the fixed amount of paste interposed between the surface and the protrusion.

In accordance with additional or alternative embodiments, the affixing includes pressing the protrusion onto the surface to drive the paste toward forming a fillet at a base of the protrusion.

In accordance with additional or alternative embodiments, the core is a ceramic core for forming an internal cavity of a turbine blade or vane and the surface is a pressure surface of the core.

In accordance with additional or alternative embodiments, the protrusion of each mini-core includes one or more posts, studs or bumpers and a perforated plate section having a side to which the one or more posts, studs or bumpers are attached.

In accordance with additional or alternative embodiments, the dipping includes dipping the one or more posts, studs or bumper into the supply of paste to transfer the fixed amount of paste to each of the one or more posts, studs or bumpers and the affixing includes affixing the one or more posts, studs or bumpers to the surface with the fixed amount of paste interposed between the surface and each of the one or more posts, studs or bumpers.

In accordance with additional or alternative embodiments, the dipping of the one or more posts, studs or bumpers into the supply of paste includes simultaneously dipping the one or more posts, studs or bumpers into the supply of paste and the affixing of the one or more posts, studs or bumpers to the surface includes simultaneously affixing the one or more posts, studs or bumpers to the surface.

In accordance with additional or alternative embodiments, the paste has a viscosity of about 400 to about 1700 centipoise.

In accordance with additional or alternative embodiments, the paste includes about 90% paste and about 10% thinner.

According to another aspect of the disclosure, a method of bonding multiple mini-cores to a surface of a core is provided. The method includes providing each of the mini-cores with one or more posts, studs or bumpers, simultaneously dipping each of the one or more posts, studs or bumpers of one of the mini-cores into a supply of paste to transfer a fixed quantity of paste to each of the one or more posts, studs or bumpers, simultaneously affixing the one or more posts, studs or bumpers to the surface with the fixed amount of paste interposed between the surface and each of the one or more posts, studs or bumpers and repeating the simultaneously dipping and affixing for each of the mini-cores to form a linear array of mini-cores on the surface.

In accordance with additional or alternative embodiments, the simultaneously affixing includes pressing each of the one or more posts, studs or bumpers of each of the mini-cores onto the surface to drive the paste toward forming a fillet at a base of each of the one or more posts, studs or bumpers.

In accordance with additional or alternative embodiments, the core is a ceramic core for forming an internal cavity of a turbine blade or vane and the surface is a pressure surface of the core.

In accordance with additional or alternative embodiments, each mini-core includes a perforated plate section having a side to which the corresponding one or more posts, studs or bumpers are attached.

In accordance with additional or alternative embodiments, the paste has a viscosity of about 400 to about 1700 centipoise.

In accordance with additional or alternative embodiments, the paste includes about 90% paste and about 10% thinner.

According to an aspect of the disclosure, a core and mini-core assembly is provided and includes a core including a surface, which is entirely continuous along a single plane, a mini-core including a perforated plate section having a side and one or more posts, studs or bumpers attached to and extending from the side of the plate section and paste by which each of the one or more posts, studs or bumpers is bonded to the surface. The paste includes, at each post, stud or bumper a portion of the paste interposed between the post, stud or bumper and a local section of the surface and a remaining portion of the paste forming a fillet about the post, stud or bumper.

In accordance with additional or alternative embodiments, the fillet includes a substantially uniform radius about the post, stud or bumper.

In accordance with additional or alternative embodiments, the core is a ceramic core for forming an internal cavity of a turbine blade or vane and the surface is a pressure surface of the core.

In accordance with additional or alternative embodiments, the mini-core is provided as multiple mini-cores respectively affixed to the surface in a linear array.

In accordance with additional or alternative embodiments, the paste has a viscosity of about 400 to about 1700 centipoise.

In accordance with additional or alternative embodiments, the paste includes about 90% paste and about 10% thinner.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In cases in which mini-cores are bonded to cores, the bonding paste is much stronger than the core material and forms a very aggressive bond with the core material. Thus, as will be described below, mini-cores are bonded to a core by surface bonds that are considerably simpler to accomplish than conventional bonds. The mini-core posts, studs or bumpers are dipped onto a surface of a paste in order to transfer a fixed amount of paste volume to the mini-core post, stud or bumper so that the fixed amount of paste can be used thereafter in a joint including the post, stud or bumper and another surface. In some cases, relatively thin paste can be used, as the problem of shrinking in this process does not tend to cause gaps. The paste forms a radius at the post joint.

Figure 1:
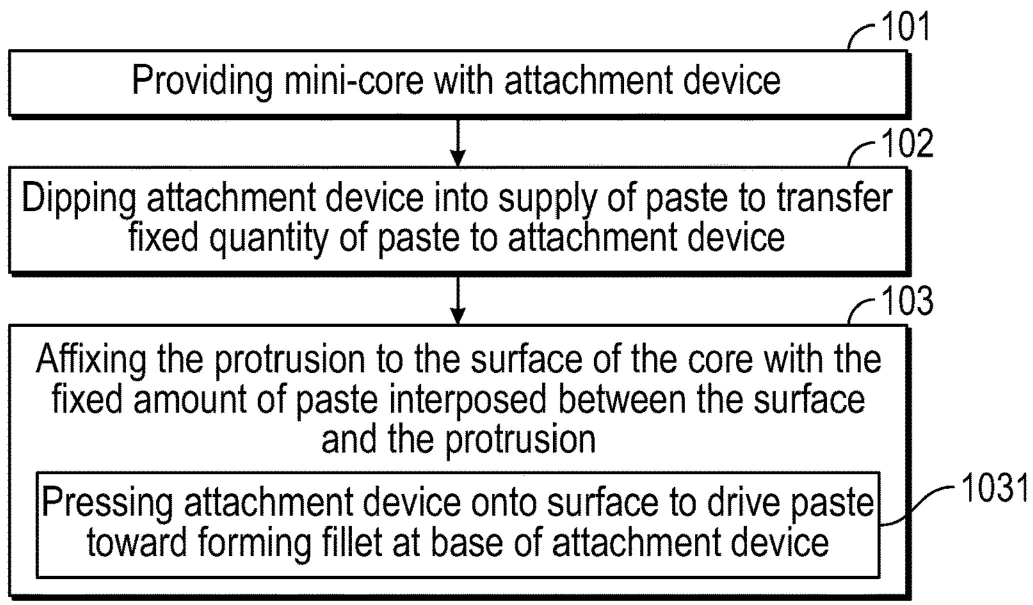
FIG. 1 is a flow diagram illustrating a method of bonding a mini-core to a surface of a core in accordance with embodiments.

With reference to FIG. 1, a method of bonding a mini-core to a surface of a core is provided. In accordance with embodiments, the core can be a ceramic core used for forming an internal cavity of a turbine vane or blade and the surface of the core can be provided at the pressure surface side of the core. As shown in FIG. 1, the method includes providing the mini-core with an attachment device, where the attachment device includes a protrusion of a surface of the mini-core and the protrusion includes a post, stud or bumper (101), dipping the protrusion into a supply of paste to transfer a fixed quantity of paste to the protrusion (102) and affixing the protrusion to the surface with the fixed amount of paste interposed between the surface and the protrusion (103). The affixing of operation 103 includes pressing the protrusion onto the surface to drive the paste toward forming a fillet at a base of the protrusion (1031).

In accordance with embodiments, the paste can be an alumina-based, silica-based or zirconia-based aqueous or non-aqueous paste that can cure at or near room temperature within a time window of about six hours or less, four hours or two hours or less or, in some cases, on the order of minutes or about ~10-~20 seconds. The paste has a viscosity of about 400 to about 1700 centipoise, or about 700 to about 1200 centipoise, about 800 to about 900 centipoise or about 830 centipoise. In order to achieve a desired viscosity and for ease of use, the paste may include about 5% to about 20% of a thinner, about 8% to about 15% of a thinner, about 9% to about 12% of a thinner or about 10% of a thinner The thinner can be provided as a sodium silicate solution that is blended with the paste to achieve a desired viscosity. In accordance with further embodiments, the paste can be provided as Resbond 989FS™ available from Cotronics Corporation and the thinner can be provided as A2101 fluid available from Cotronics Corporation.

Although it is not required, each mini-core can include one or more attachment devices and a perforated plate section having a side to which the one or more attachment devices are attached and from which the one or more attachment devices extend. In these or other cases, the dipping of operation 102 includes dipping the one or more attachment devices into the supply of paste to transfer the fixed amount of paste to each of the one or more attachment devices and the affixing of operation 103 includes affixing the one or more attachment devices to the surface with the fixed amount of paste interposed between the surface and each of the one or more attachment devices. In further detail, the dipping of the one or more attachment devices into the supply of paste can include simultaneously dipping the one or more attachment devices into the supply of paste and the affixing of the one or more posts to the surface can include simultaneously affixing the one or more attachment devices to the surface.

Figure 2:
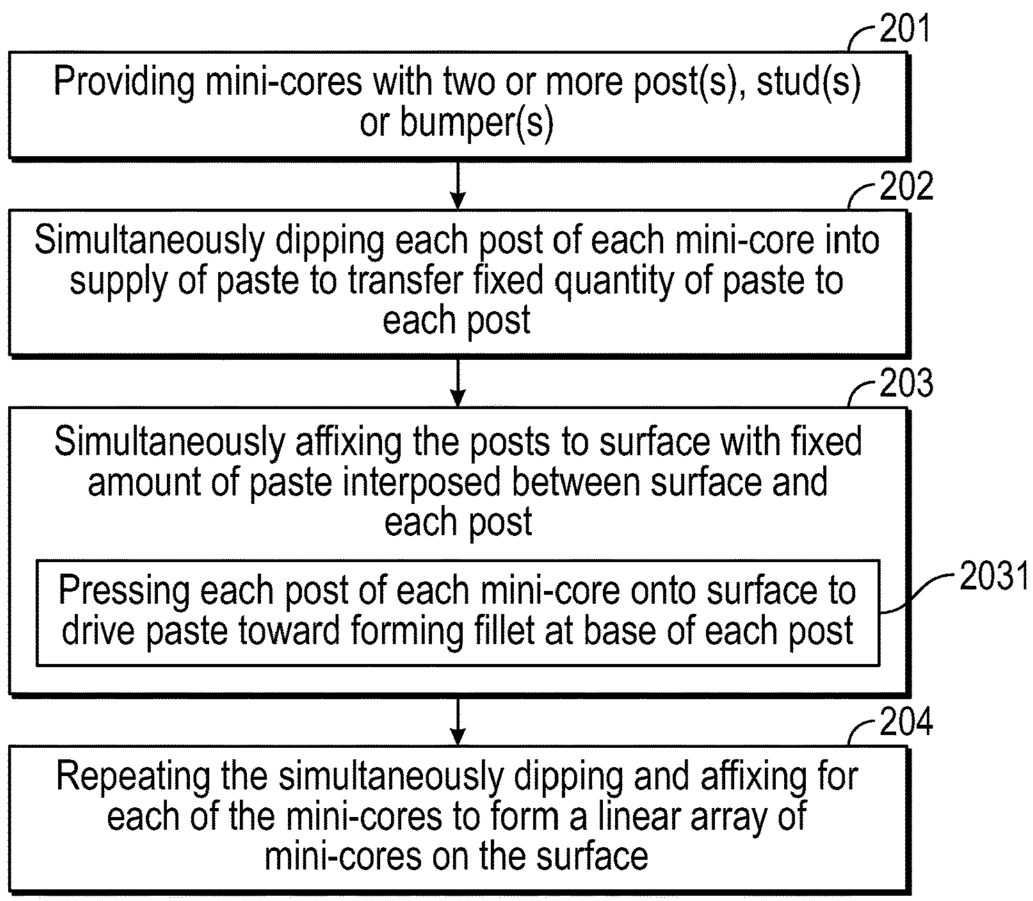
FIG. 2 is a flow diagram illustrating a method of bonding multiple mini-cores to a surface of a core in accordance with embodiments.

With reference to FIG. 2, a method of bonding multiple mini-cores to a surface of a core is provided. As above, in accordance with embodiments, the core can be a ceramic core used for forming an internal cavity of a turbine vane or blade and the surface of the core can be provided at the pressure surface side of the core. As shown in FIG. 2, the method includes providing each of the mini-cores with one or more posts, studs or bumpers (201), simultaneously dipping each of the one or more posts, studs or bumpers of one of the mini-cores into a supply of paste to transfer a fixed quantity of paste to each of the one or more posts, studs or bumpers (202), simultaneously affixing the one or more posts, studs or bumpers to the surface with the fixed amount of paste interposed between the surface and each of the one or more posts, studs or bumpers (203) and repeating the simultaneously dipping and affixing for each of the mini-cores to form a linear array of mini-cores on the surface (204). The simultaneously affixing of operation 203 can include pressing each of the one or more posts, studs or bumpers of each of the mini-cores onto the surface to drive the paste toward forming a fillet at a base of each of the one or more posts, studs or bumpers (2031).

Also as above, in accordance with embodiments, the paste can be an alumina-based, silica-based or zirconia-based aqueous or non-aqueous paste that can cure at or near room temperature within a time window of about six hours or less, four hours or two hours or less or, in some cases, on the order of minutes or about ~10-~20 seconds. The paste has a viscosity of about 400 to about 1700 centipoise, or about 700 to about 1200 centipoise, about 800 to about 900 centipoise or about 830 centipoise. In order to achieve a desired viscosity and for ease of use, the paste may include about 5% to about 20% of a thinner, about 8% to about 15% of a thinner, about 9% to about 12% of a thinner or about 10% of a thinner The thinner can be provided as a sodium silicate solution that is blended with the paste to achieve a desired viscosity. In accordance with further embodiments, the paste can be provided as Resbond 989FS™ available from Cotronics Corporation and the thinner can be provided as A2101 fluid available from Cotronics Corporation.

Although it is not required, each mini-core can include a perforated plate section having a side to which the corresponding one or more posts, studs or bumpers are attached and from which the corresponding one or more posts, studs or bumpers extend.

Figure 3:
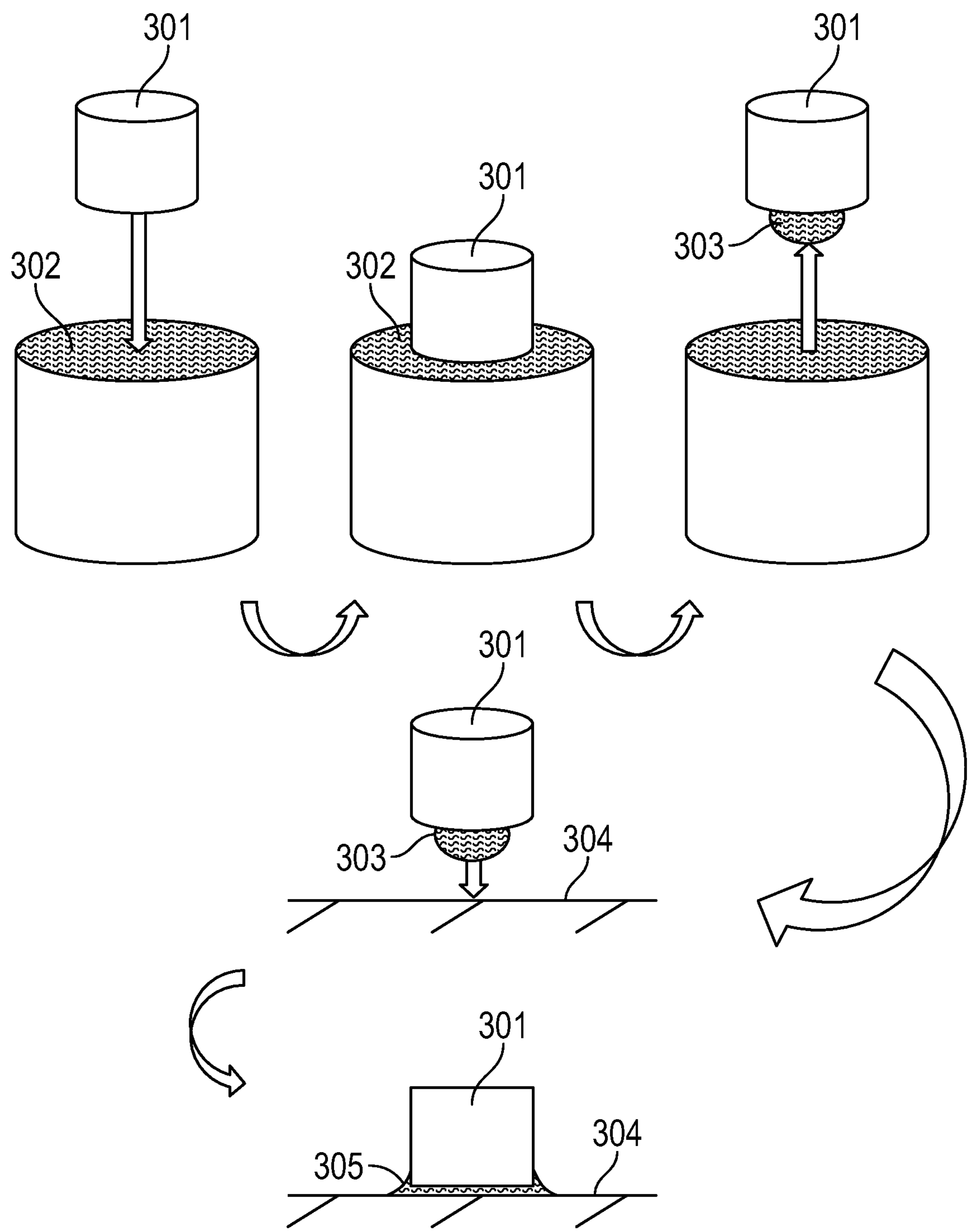
FIG. 3 is a graphical illustration of a dipping of a post, stud or bumper into a supply of paste and an affixing of the post, stud or bumper onto a surface of a core in accordance with embodiments.

With reference to FIG. 3, the dipping and affixing operations of the methods of FIGS. 1 and 2 described above are illustrated graphically. As shown in FIG. 3, an exemplary attachment device is post, stud or bumper 301, which is initially dipped into and removed from the supply of paste 302. The viscosity of the paste results in a fixed amount of paste 303 being disposed on the distal edge of the post, stud or bumper 301. Subsequently, the post, stud or bumper 301 is pressed onto the surface 304. This causes the fixed amount of paste 303 to spread evenly between the distal edge of the post, stud or bumper 301 and the surface 304 and to eventually form a fillet 305 about the post, stud or bumper 301 (the final image in FIG. 3 is a side view and the other images are perspective views). This fillet 305 has a substantially uniform radius about the post, stud or bumper 301.

Figure 4:
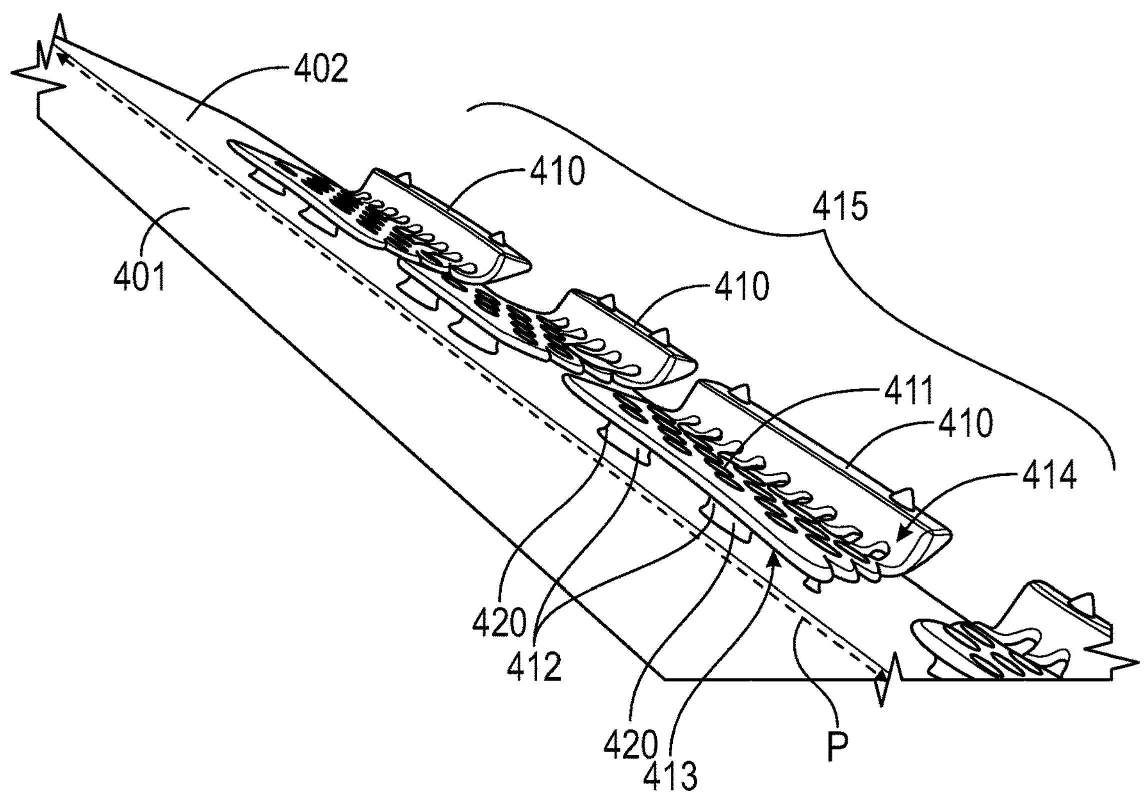
FIG. 4 is a perspective view of a core and mini-core assembly in accordance with embodiments.
Figure 5:
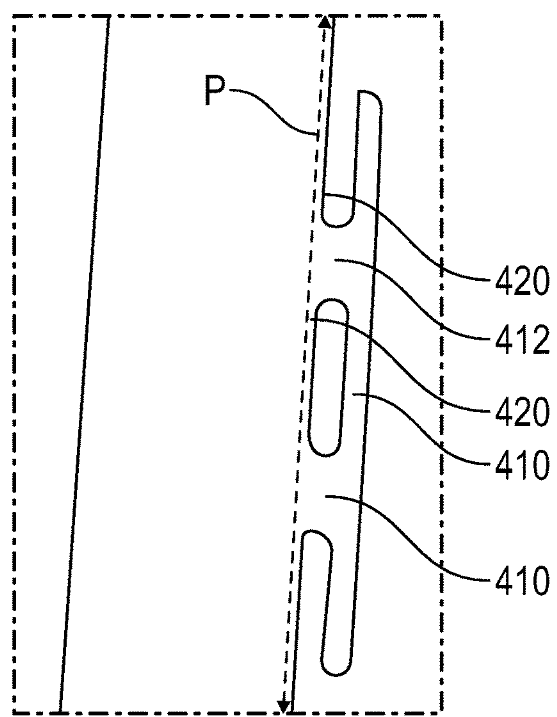
FIG. 5 is a side view of the core and mini-core assembly of FIG. 4.
Figure 6:
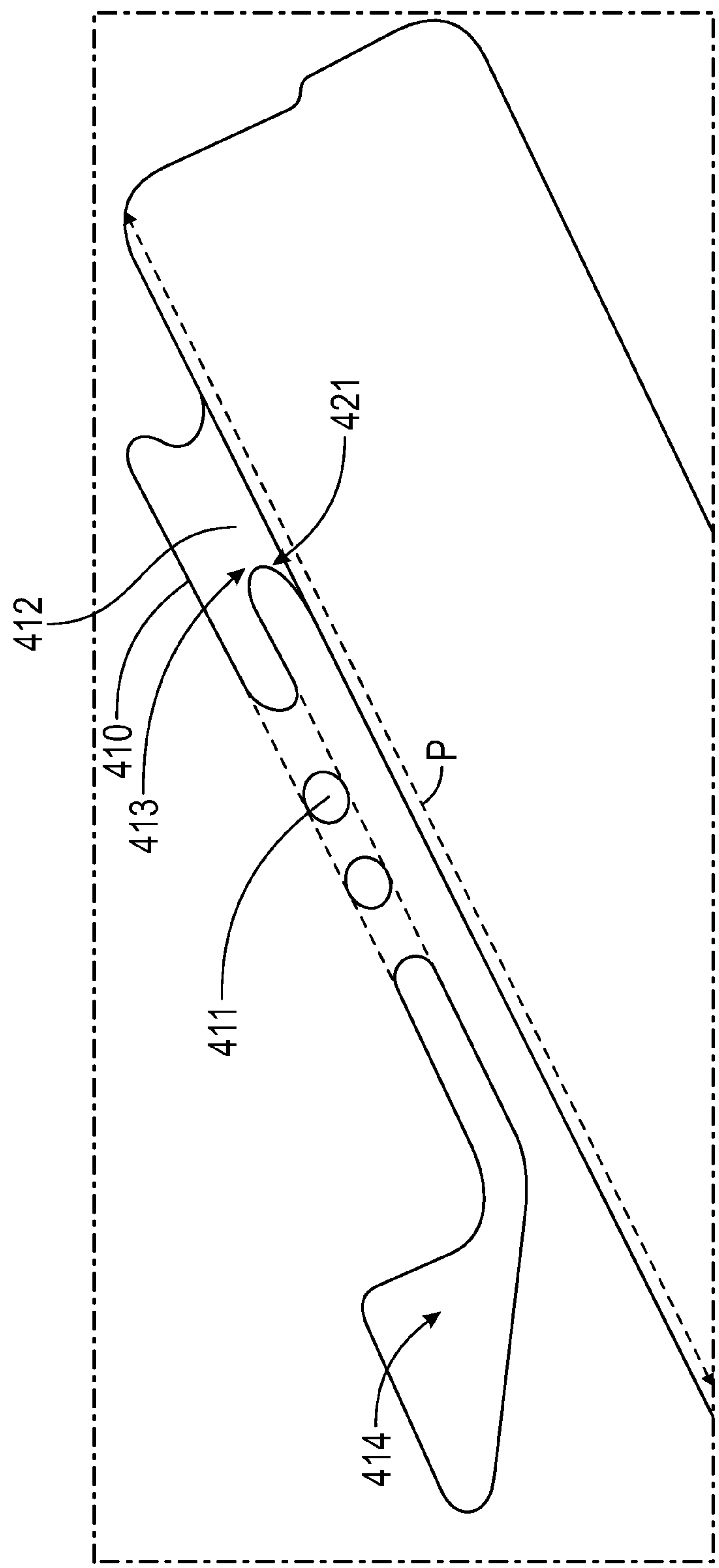
FIG. 6 is a side view of the core and mini-core assembly of FIG. 4 along a different viewing angle from FIG. 5.

With reference to FIGS. 4-6, a core and mini-core assembly is provided and can be assembled by execution of the methods of FIGS. 1 and 2 and in FIG. 3. As shown in FIGS. 4-6, the core and mini-core assembly includes a core 401 including a surface 402, which is substantially entirely continuous along a single plane P, a mini-core 410 and paste 420. The core 401 can be a ceramic core for forming an internal cavity of a turbine blade or vane and the surface 402 is a pressure surface side of the core 401. The mini-core 410 includes a perforated plate section 411 and one or more posts, studs or bumpers 412 attached to and extending from a side 413 of the plate section 411. The mini-core 410 can further include an upturned side 414, which is opposite the side 413. The upturned side 414 is generally not equipped with additional posts, studs or bumpers. As such, the mini-core 410 is cantilevered to the surface 402. The paste 420 allows and provides for a bonding by which each of the one or more posts, studs or bumpers 412 is bonded to the surface 402.

In accordance with embodiments, the paste 420 can be an alumina-based, silica-based or zirconia-based aqueous or non-aqueous paste that can cure at or near room temperature within a time window of about six hours or less, four hours or two hours or less or, in some cases, on the order of minutes or about ~10-~20 seconds. The paste 420 has a viscosity of about 400 to about 1700 centipoise, or about 700 to about 1200 centipoise, about 800 to about 900 centipoise or about 830 centipoise. In order to achieve a desired viscosity and for ease of use, the paste 420 may include about 5% to about 20% of a thinner, about 8% to about 15% of a thinner, about 9% to about 12% of a thinner or about 10% of a thinner The thinner can be provided as a sodium silicate solution that is blended with the paste 420 to achieve a desired viscosity. In accordance with further embodiments, the paste 420 can be provided as Resbond 989FS™ available from Cotronics Corporation and the thinner can be provided as A2101 fluid available from Cotronics Corporation.

When the paste 420 provides for the bonding, the paste 420 includes, at each post, stud or bumper 412, a portion of the paste 420 interposed between the post, stud or bumper 412 and a local section of the surface 402 and a remaining portion of the paste forming a fillet 421 (see FIG. 6) about the post, stud or bumper 412. The fillet 421 can include a substantially uniform radius about the post, stud or bumper 412.

As further shown in FIG. 4, in accordance with embodiments, the mini-core 410 is provided as multiple mini-cores 410 that are respectively affixed to the surface 402 in a linear array 415. This linear array 415 can be assembled all at once or with each of the multiple mini-cores 410 affixed to the surface 402 in sequence.

Technical effects and benefits of the present disclosure are the provision of surface bonding technique that allows a faster, easier method of bonding mini cores to surfaces of cores, and produces a better quality radius at the foot of the post of the mini core. Dipping the post ends just to surface contact the paste volume automatically transfers a fixed amount of paste to the joint so no precision dispensing is required. The surface bonding technique also accommodates slight core variance, is easy to automate and requires no manual post finishing touch up. A skilled technician can be able to manually make high quality bonds using this approach in about 2 minutes.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A core and mini-core assembly, comprising:

a core comprising a surface, which is entirely continuous along a single plane;

a mini-core comprising a perforated plate section having a side and one or more posts, studs or bumpers attached to and extending from the side of the plate section; and paste by which each of the one or more posts, studs or bumpers is bonded to the surface, the paste comprising, at each post, stud or bumper:

a first portion of the paste interposed between the post, stud or bumper and a local section of the surface; and a remaining portion of the paste forming a fillet about sides of the first portion of the paste and about sides of the post, stud or bumper which are proximate to the local section of the surface, wherein:

the fillet extends away from the local section of the surface and along the sides of the first portion of the paste and the sides of the post, stud or bumper which are proximate to the local section of the surface, and wherein the fillet is disposed about the sides of the first portion of the paste and about the sides of the post, stud or bumper which are proximate to the local section of the surface.

2. The core and mini-core assembly according to claim 1, wherein the core is a ceramic core for forming an internal cavity of a turbine blade or vane and the surface is a pressure surface of the core.

3. The core and mini-core assembly according to claim 1, wherein the mini-core is provided as multiple mini-cores respectively affixed to the surface in a linear array.

4. The core and mini-core assembly according to claim 1, wherein the paste has a viscosity of about 400 to about 1700 centipoise.

5. The core and mini-core assembly according to claim 1, wherein the paste comprises about 90% paste and about 10% thinner.

6. The core and mini-core assembly according to claim 1, wherein an outer surface of the fillet has a concave curvature that terminates at the local section of the surface and at the sides of the post, stud or bumper which are proximate to the local section of the surface.

7. A core and mini-core assembly, comprising:

a core comprising a surface;

a mini-core comprising a plate section having a side and one or more posts, studs or bumpers attached to and extending from the side of the plate section; and paste by which each of the one or more posts, studs or bumpers is bonded to the surface, the paste comprising, at each post, stud or bumper:

a first portion interposed between the post, stud or bumper and a local section of the surface; and a remaining portion forming a fillet about sides of the first portion and about sides of the post, stud or bumper which are proximate to the local section of the surface, wherein:

the fillet extends away from the local section of the surface and along the sides of the first portion of the paste and the sides of the post, stud or bumper which are proximate to the local section of the surface, and the fillet is disposed about the sides of the first portion and about the sides of the post, stud or bumper which are proximate to the local section of the surface.

8. The core and mini-core assembly according to claim 7, wherein the surface is entirely continuous along a single plane.

9. The core and mini-core assembly according to claim 7, wherein the plate section is perforated.

10. The core and mini-core assembly according to claim 7, wherein the core is a ceramic core for forming an internal cavity of a turbine blade or vane and the surface is a pressure surface of the core.

11. The core and mini-core assembly according to claim 7, wherein the mini-core is provided as multiple mini-cores respectively affixed to the surface in a linear array.

12. The core and mini-core assembly according to claim 7, wherein the paste has a viscosity of about 400 to about 1700 centipoise.

13. The core and mini-core assembly according to claim 7, wherein the paste comprises about 90% paste and about 10% thinner.

14. The core and mini-core assembly according to claim 7, wherein an outer surface of the fillet has a concave curvature that terminates at the local section of the surface and at the sides of the post, stud or bumper which are proximate to the local section of the surface.

15. A core and mini-core assembly, comprising:

a surface;

a mini-core comprising a plate section and one or more posts, studs or bumpers attached to and extending from the plate section; and paste by which each of the one or more posts, studs or bumpers is bonded to the surface, the paste comprising, at each post, stud or bumper:

a first portion interposed between the post, stud or bumper and a local section of the surface; and a remaining portion forming a concave fillet about sides of the first portion and about sides of the post, stud or bumper which are proximate to the local section of the surface, wherein:

the concave fillet extends away from the local section of the surface and along the sides of the first portion of the paste and the sides of the post, stud or bumper which are proximate to the local section of the surface, and the concave fillet is disposed about the sides of the first portion and about the sides of the post, stud or bumper which are proximate to the local section of the surface.

* * * * *